(12) United States Patent
Kamiya et al.

(10) Patent No.: US 11,745,618 B2
(45) Date of Patent: Sep. 5, 2023

(54) CONTROL SYSTEM OF ALL-SOLID-STATE LITHIUM ION BATTERY

(71) Applicant: TOYOTA JIDOSHA KABUSHIKI KAISHA, Toyota (JP)

(72) Inventors: Masato Kamiya, Toyota (JP); Satomi Hayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/688,138

(22) Filed: Mar. 7, 2022

(65) Prior Publication Data

US 2022/0305953 A1    Sep. 29, 2022

(30) Foreign Application Priority Data

Mar. 26, 2021    (JP) .................................. 2021-053669

(51) Int. Cl.
| | |
|---|---|
| *B60L 58/15* | (2019.01) |
| *H01M 10/0525* | (2010.01) |
| *H01M 10/46* | (2006.01) |
| *B60L 50/60* | (2019.01) |
| *B60L 7/10* | (2006.01) |
| *H01M 10/42* | (2006.01) |

(52) U.S. Cl.
CPC ................. B60L 58/15 (2019.02); B60L 7/10 (2013.01); B60L 50/60 (2019.02); H01M 10/0525 (2013.01); H01M 10/425 (2013.01); H01M 10/46 (2013.01); *H01M 2010/4271* (2013.01); *H01M 2220/20* (2013.01)

(58) Field of Classification Search
CPC ................................. B60L 58/15; B60L 58/60
See application file for complete search history.

(56) References Cited

U.S. PATENT DOCUMENTS

| | | | | |
|---|---|---|---|---|
| 11,509,153 | B2* | 11/2022 | Alipoor | H02J 7/0048 |
| 2018/0316195 | A1* | 11/2018 | Verbrugge | H01M 10/44 |
| 2019/0229378 | A1* | 7/2019 | Zhang | G01R 31/392 |
| 2020/0014071 | A1* | 1/2020 | Nakashima | B60L 50/50 |
| 2022/0024323 | A1* | 1/2022 | Kresse, III | B60W 10/04 |
| 2022/0305942 | A1* | 9/2022 | Mannepalli | B60L 53/65 |

FOREIGN PATENT DOCUMENTS

| | | |
|---|---|---|
| JP | 2010-212019 A | 9/2010 |
| WO | 2020/123921 A1 | 6/2020 |

* cited by examiner

*Primary Examiner* — Jared Fureman
*Assistant Examiner* — Esayas G Yeshaw
(74) *Attorney, Agent, or Firm* — Dinsmore & Shohl LLP

(57) ABSTRACT

Provided is a control system of an all-solid-state lithium ion battery which is capable of improving safety. The control system of an all-solid-state lithium ion battery installed in a vehicle includes: an all-solid-state lithium ion battery connected to a motor for driving a vehicle; and a control unit controlling input and output of a current to the all-solid-state lithium ion battery, wherein the all-solid-state lithium ion battery includes an anode containing lithium titanate, and the control unit adds the number of seconds or a current value whenever the charged capacity of the all-solid-state lithium ion battery exceeds 100% of SOC due to an overcurrent, calculates the decreased amount of the SOC limit based on a value obtained from the addition, calculates the second specified SOC based on the decreased amount of the SOC limit, and controls the all-solid-state lithium ion battery based on the second specified SOC.

1 Claim, 4 Drawing Sheets

CONTROL SYSTEM OF ALL-SOLID-STATE LITHIUM ION BATTERY

CROSS-REFERENCE TO RELATED APPLICATIONS

This application is based upon and claims the benefit of priority of the prior Japanese Patent Application No. 2021-053669 filed Mar. 26, 2021, the entire contents of which are incorporated herein by reference.

FIELD

The present application relates to a control system of an all-solid-state lithium ion battery.

BACKGROUND

Patent Literature 1 discloses a control device for a lithium ion battery which prevents deterioration of the battery due to lithium deposits on an anode surface which are generated by a slip of a wheel of an automobile or a sudden acceleration/deceleration of the automobile.

Specifically, Patent Literature 1 discloses a control device for a lithium ion battery which is for driving a driving motor and which is configured to control a lithium ion battery equipped with a heater: the control device includes a counter configured to count how many times an overcurrent flows in the driving motor, and a heating unit configured to heat the lithium ion battery with the heater if the number of times counted in the counter exceeds a predetermined value.

CITATION LIST

Patent Literature

Patent Literature 1: JP 2010-212019 A

SUMMARY

Technical Problem

A secondary battery installed in a vehicle is usually controlled, so that the charged capacity is at most the SOC limit in order for the battery not to be overcharged. However, as described above, the battery may be spontaneously or momentarily overcharged due to, for example, a slip during regenerative control. The inventors of the present disclosure found that in such a case, the battery capacity of an all-solid-state lithium ion battery including an anode that contains lithium titanate decreases in an overcharge range once the charged capacity is in the overcharge range. They also found that if the battery is overcharged again in this state, the resistance heat generation may occur because the SOC limit has decreased.

In view of the above circumstances, an object of the present disclosure is to provide a control system of an all-solid-state lithium ion battery which is capable of improving safety.

Solution to Problem

As one aspect to solve the above problems, the present disclosure is provided with a control system of an all-solid-state lithium ion battery installed in a vehicle, the control system comprising: an all-solid-state lithium ion battery connected to a motor for driving a vehicle; and a control unit controlling input and output of a current to the all-solid-state lithium ion battery, so that a charged capacity does not exceed a first specified SOC of the all-solid-state lithium ion battery in normal driving, wherein the all-solid-state lithium ion battery includes an anode containing lithium titanate, and the control unit adds a number of seconds or a current value whenever the charged capacity of the all-solid-state lithium ion battery exceeds 100% of SOC due to an overcurrent, calculates a decreased amount of a SOC limit based on a value obtained from the addition, calculates a second specified SOC based on the decreased amount of a SOC limit, and controls the all-solid-state lithium ion battery based on the second specified SOC.

Effects

The control system of an all-solid-state lithium ion battery according to the present disclosure is configured to grasp decrease in the SOC limit of the all-solid-state lithium ion battery if the charged capacity is spontaneously in the overcharge range, and to control the all-solid-state lithium ion battery based on the second specified SOC, which is newly calculated based on the grasped result. Thus, the control system is capable of controlling the battery so that the charged capacity is at most the SOC limit even if the charged capacity is spontaneously in the overcharge range thereafter, to suppress heat generation of the battery. Therefore, the control system of an all-solid-state lithium ion battery is capable of improving safety.

DESCRIPTION OF EMBODIMENTS

First Embodiment

Figure 1:
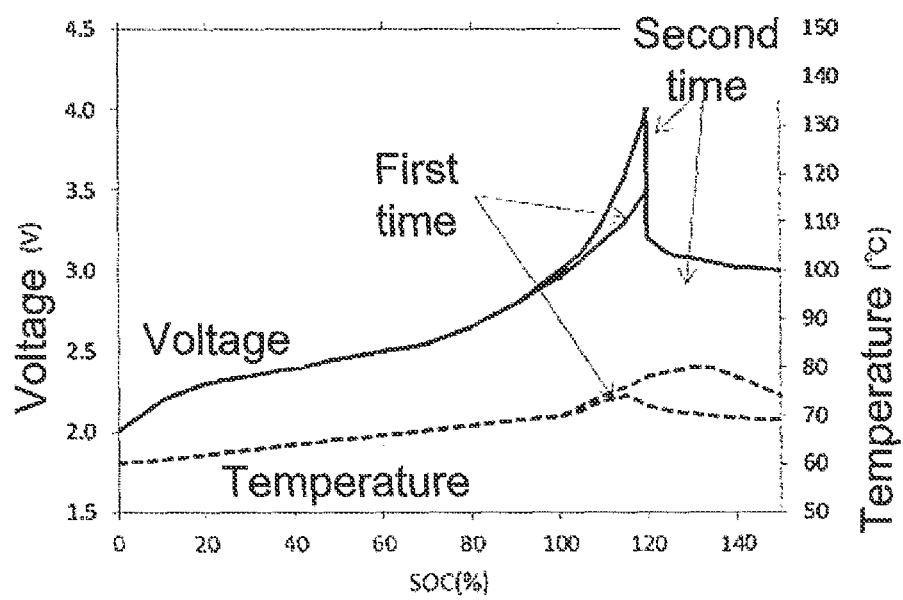
FIG. 1 shows the relationship between the voltage and the temperature, and the SOC when an all-solid-state lithium ion battery with LTO is overcharged twice.

The first embodiment is a control system of an all-solid-state lithium ion battery installed in a vehicle. This control system of an all-solid-state lithium ion battery is provided with an all-solid-state lithium ion battery and a control unit.

All-Solid-State Lithium Ion Battery

An all-solid-state lithium ion battery that may be used in the first embodiment is connected to a motor for driving a vehicle. The all-solid-state lithium ion battery is configured to supply a current to the drive motor, and is charged by regeneration operation of the motor. The structure of the all-solid-state lithium ion battery is not particularly limited as long as an anode contains lithium titanate. For example, the all-solid-state lithium ion battery may have the following structure.

The all-solid-state lithium ion battery includes a cathode layer, a solid electrolyte layer, and an anode layer in this order. Each one of these electrode elements may be included, or a plurality of groups of the electrode elements may be stacked to form the all-solid-state lithium ion battery. In addition to these electrode elements, a cathode current collector and an anode current collector may be provided. Further, the all-solid-state lithium ion battery may be provided with an outer casing in which these elements are sealed. Examples of the outer casing are laminated packaging and the like.

The cathode layer contains at least a cathode active material. The cathode active material is not particularly limited as long as usable for all-solid-state lithium ion batteries. Examples of the cathode active material include lithium cobaltate, lithium nickelate (NCA-based active materials), lithium manganate, and lithium nickel cobalt manganate (NCM). The cathode layer may optionally contain a solid electrolyte, a conductive aid, or a binder. Examples of the solid electrolyte include oxide solid electrolytes and sulfide solid electrolytes. Examples of the oxide solid electrolytes include $Li_7La_3Zr_2O_{12}$ and $Li_{7-x}La_3Zr_{1-x}Nb_xO_{12}$. Examples of the sulfide solid electrolytes include $Li_3PS_4$ and $Li_2S$—$P_2S_5$. Examples of the conductive aid include carbon materials such as acetylene black, Ketjenblack, and vapor grown carbon fiber (VGCF). Examples of the binder include butadiene rubber (BR), butyl rubber (IIR), and polyvinylidene fluoride (PVdF). The contents of the foregoing in the cathode layer, and the thickness of the cathode layer may be the same as conventional ones.

The solid electrolyte layer contains at least a solid electrolyte. The solid electrolyte is not particularly limited as long as usable for all-solid-state lithium ion batteries. For example, the solid electrolyte same as that used in the cathode layer may be used. The electrolyte layer may optionally contain a binder. The binder same as that used in the cathode layer may be used. The contents of the foregoing in the electrolyte layer, and the thickness of the electrolyte layer may be the same as conventional ones.

The anode layer contains lithium titanate (LTO) as an anode active material, and may also contain any other anode active materials. Examples of the other anode active materials include metal active materials such as Li and Si, and carbon active materials such as graphite. The anode layer may optionally contain a solid electrolyte, a conductive aid, or a binder. The solid electrolyte, the conductive aid, and the binder same as those used in the cathode layer may be used. The contents of the foregoing in the anode layer, and the thickness of the anode layer may be the same as conventional ones.

Any known metal foil may be used for the cathode current collector and the anode current collector. Examples of the metal foil include foil of metals such as Cu, Ni, Cr, Au, Pt, Ag, Al, Fe, Ti, Zn, Co, and stainless steel.

There is no particular limitations on methods of manufacturing the cathode layer, the electrolyte layer, and the anode layer. These layers may be manufactured according to known methods. For example, when the cathode layer is made, a material to constitute the cathode layer is mixed with a solvent to form a slurry, and the slurry is applied to a substrate or the cathode current collector, and dried. Whereby the cathode layer can be manufactured. The same method may be employed as the methods of manufacturing the electrolyte layer and the anode layer. A stack may be made by stacking the cathode current collector, the cathode layer, the electrolyte layer, the anode layer, and the anode current collector in this order.

Control Unit

A control unit that may be used in the first embodiment controls input and output of a current to the all-solid-state lithium ion battery, so that the charged capacity does not exceed the first specified SOC of the all-solid-state lithium ion battery in normal driving. The control unit is usually configured with an arithmetic unit such as a computer.

"Normal driving" is driving when the charged capacity of the all-solid-state lithium ion battery is at most 100% of SOC. "First specified SOC" is calculated based on the SOC limit of the all-solid-state lithium ion battery, and is a threshold value set in order for the charged capacity of the all-solid-state lithium ion battery not to reach the SOC limit. "SOC limit" is a limit to the charged capacity: when the charged capacity is at most the SOC limit, anomalous heat generation which is more than heat generation in a range of normal use does not occur.

As described above, the control unit controls the all-solid-state lithium ion battery, so that the charged capacity does not exceed the first specified SOC. However, the charged capacity of the all-solid-state lithium ion battery may exceed 100% of SOC when an overcurrent is generated by a skid or a rapid acceleration or deceleration. The present inventors found that in such a case, the battery capacity of an all-solid-state lithium ion battery including an anode that contains lithium titanate (LTO) decreases in an overcharge range (range where the SOC exceeds 100%) once the charged capacity is in the overcharge range. They also found that if the battery is overcharged again in this state, the resistance heat generation may occur because the SOC limit has decreased.

Figure 2:
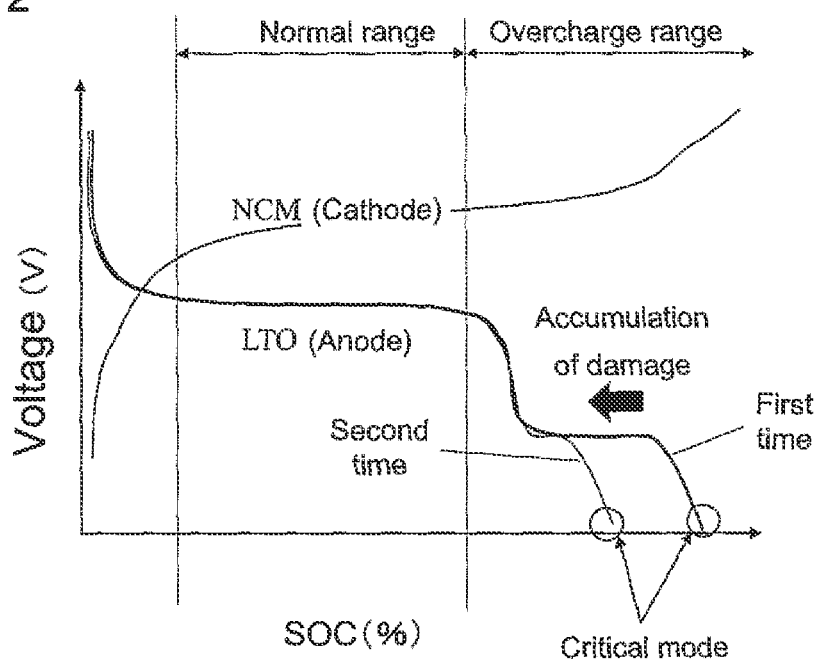
FIG. 2 shows a comparison between the profiles of an anode (LTO) and a cathode (NMC) in a test shown in FIG. 1.

The foregoing will be further described, using FIGS. 1 and 2. First, FIG. 1 will be described. FIG. 1 shows the relationship between the voltage and the temperature, and the SOC when the all-solid-state lithium ion battery with LTO is overcharged twice. As shown in FIG. 1, the profile when the battery is in the overcharged state the second time changes from that when the battery is in the overcharged state the first time. Specifically, the voltage transition between 10% and 100% of SOC the second time hardly changes from that the first time, but the voltage tend to rise the second time when SOC is over 100%. That is, it is imagined that the battery deteriorates once the charged capacity is in the overcharge range.

Next, FIG. 2 will be described. FIG. 2 shows a comparison between the profiles of the anode (LTO) and the cathode (NMC: lithium nickel manganese cobalt oxide) in the test shown in FIG. 1. As in FIG. 2, the profile of the cathode does not change, but only the profile of the anode the second time changes from that the first time. Damage is accumulated in the anode due to the overcharging, which facilitates the voltage of the anode the second time to be in a critical mode. Therefore, it is imagined from FIG. 2 that the anode (LTO) deteriorates due to overcharging.

As described above, when an all-solid-state lithium ion battery including LTO as an anode is installed in a vehicle, overcharging decreases the level of safety of the battery. Thus, the control has to be changed according to this.

Then, in the first embodiment, the control unit adds the number of seconds or a current value whenever the charged capacity of the all-solid-state lithium ion battery exceeds 100% of SOC due to an overcurrent, calculates the decreased amount of the SOC limit based on the number of seconds or the current value obtained from the addition, calculates the second specified SOC based on the decreased amount of the SOC limit, and controls the all-solid-state lithium ion battery based on the second specified SOC.

"100% of SOC" is 100% of the charged capacity of the all-solid-state lithium ion battery, which is set based on the SOC limit, and is a value smaller than the first specified SOC. "Decreased amount of the SOC limit" is a difference between the SOC limit before and after the SOC limit decreases due to overcharging. Such a decreased amount of the SOC limit may be obtained from the relationship between the number of seconds or the current value obtained from the addition, and the decreased amount of the SOC limit, which is obtained in advance experimentally or from simulations. "Second specified SOC" is calculated from the SOC limit newly calculated based on the decreased amount of the SOC limit, and is a threshold value set in order for the charged capacity of the all-solid-state lithium ion battery not to reach the decreased SOC limit. "Control the all-solid-state lithium ion battery based on the second specified SOC" means that the control unit controls input and output of a current to the all-solid-state lithium ion battery, so that the charged capacity does not exceed the second specified SOC in normal driving.

The control unit may control a vehicle to stop driving, and/or control regenerative charging to stop if a current SOC is at least the decreased SOC limit when the decreased amount of the SOC limit is calculated.

Figure 3:
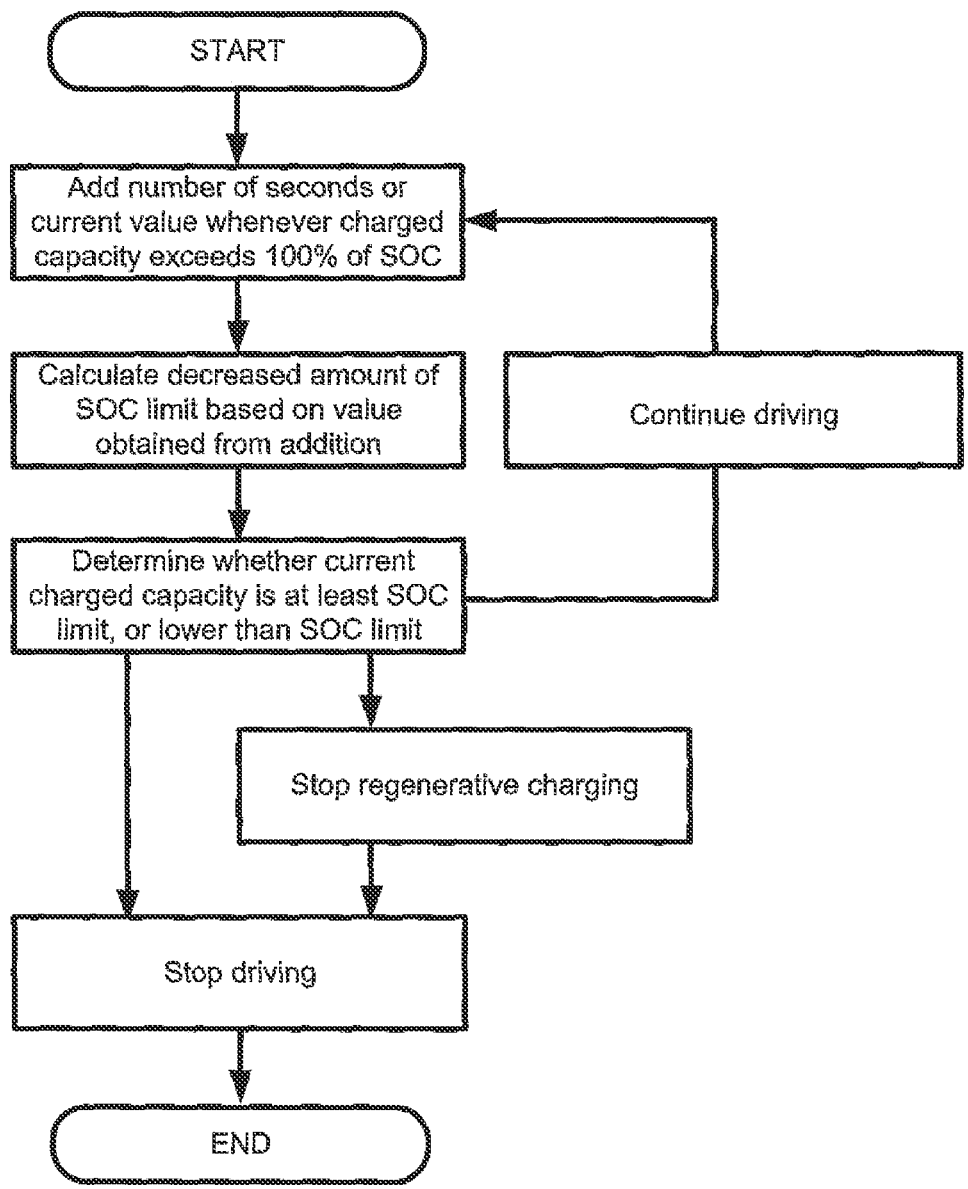
FIG. 3 shows one example of a flowchart of control according to the first embodiment.

Next, FIG. 3 shows one example of a flowchart for performing the control according to the first embodiment. As shown in FIG. 3, first, the control unit adds the number of seconds or a current value whenever the charged capacity exceeds 100% of SOC due to an overcurrent. Next, based on the value obtained from the addition, the decreased amount of the SOC limit is calculated. Then, it is determined whether the current charged capacity is at least the decreased SOC limit calculated from the decreased amount of the SOC limit, or lower than this decreased SOC limit. If the current charged capacity is at least the decreased SOC limit, driving of the vehicle is stopped, or driving of the vehicle is stopped after regenerative charging is stopped. If the current charged capacity is lower than the decreased SOC limit, the all-solid-state lithium ion battery is controlled based on the second specified SOC calculated based on the decreased amount of the SOC limit, and driving of the vehicle is continued.

Second Embodiment

In the second embodiment, the control unit calculates a slope of the voltage after the charged capacity of the all-solid-state lithium ion battery exceeds 100% of SOC due to an overcurrent, and controls the all-solid-state lithium ion battery based on the slope of the voltage. Therefore, the configuration other than the above is the same as in the first embodiment.

As in FIG. 1, the slope of the voltage after the charged capacity exceeds 100% of SOC changes due to an overcurrent. Therefore, in the second embodiment, the safety of the battery is determined according to this slope of the voltage.

If the slope of the voltage is at least a predetermined value, the all-solid-state lithium ion battery is controlled based on the determination that the SOC limit decreases. When such control is performed, it is necessary to obtain the relationship between the slope of the voltage after the charged capacity exceeds 100% of SOC, and the SOC limit, in advance experimentally or from simulations.

Figure 4:
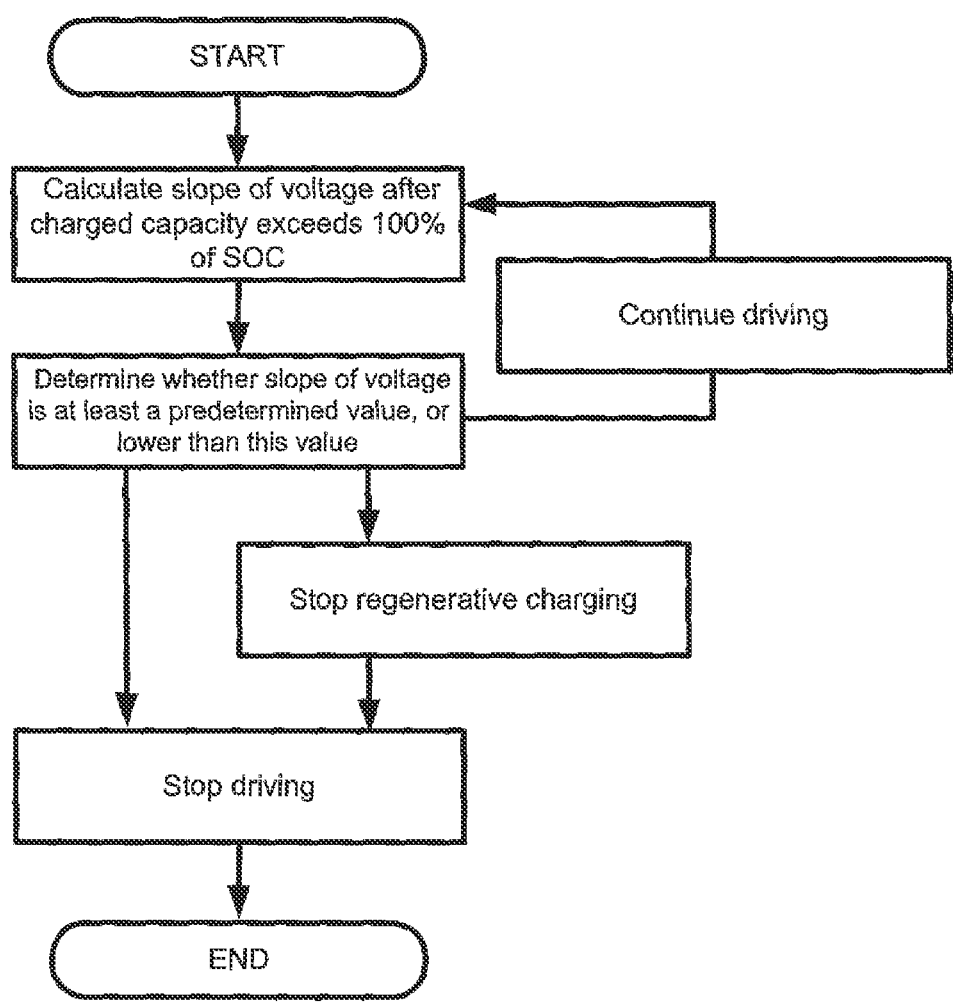
FIG. 4 shows one example of a flowchart of control according to the second embodiment.

FIG. 4 shows one example of a flowchart for performing the control according to the second embodiment. As shown in FIG. 4, first, the control unit calculates the slope of the voltage after the charged capacity exceeds 100% of SOC due to an overcurrent. Next, it is determined whether this slope of the voltage is at least a predetermined value, or lower than this value. If the slope of the voltage is at least the predetermined value, driving of the vehicle is stopped, or driving of the vehicle is stopped after regenerative charging is stopped. If the slope of the voltage is lower than the predetermined value, the all-solid-state lithium ion battery is controlled based on the determination that the safety of the all-solid-state battery is secured, and driving of the vehicle is continued.

INDUSTRIAL APPLICABILITY

The control system of an all-solid-state lithium ion battery according to the present disclosure has been described. The control system of an all-solid-state lithium ion battery according to the present disclosure is capable of improving safety of an all-solid-state lithium ion battery, and thus can be said to be one of important techniques in a field of secondary batteries to be installed in vehicles.

What is claimed is:

1. A control system of an all-solid-state lithium ion battery installed in a vehicle, the control system comprising:
   an all-solid-state lithium ion battery connected to a motor for driving a vehicle; and
   a control unit controlling input and output of a current to the all-solid-state lithium ion battery, so that a charged capacity does not exceed a first specified SOC of the all-solid-state lithium ion battery in normal driving,
   wherein the all-solid-state lithium ion battery includes an anode containing lithium titanate, and
   the control unit adds a number of seconds or a current value whenever the charged capacity of the all-solid-state lithium ion battery exceeds 100% of SOC due to an overcurrent, calculates a decreased amount of a SOC limit based on a value obtained from the addition, calculates a second specified SOC based on the decreased amount of a SOC limit, and controls the all-solid-state lithium ion battery based on the second specified SOC.

* * * * *